United States Patent [19]

Adams

[11] Patent Number: 5,195,549

[45] Date of Patent: Mar. 23, 1993

[54] CLEANING DEVICE

[76] Inventor: James C. Adams, 845 S. Winton Rd., Rochester, N.Y. 14618-1607

[21] Appl. No.: 748,885

[22] Filed: Aug. 23, 1991

[51] Int. Cl.⁵ .............................................. B08B 3/10
[52] U.S. Cl. ...................................... 134/188; 134/901
[58] Field of Search ............... 134/901, 187, 188, 190, 134/191; 206/5.1

[56] References Cited

U.S. PATENT DOCUMENTS

| | | | |
|---|---|---|---|
| 3,115,146 | 12/1963 | Erwin | 134/901 X |
| 3,856,571 | 12/1974 | Sherman | 206/5.1 X |
| 3,880,278 | 4/1975 | Brown | 134/901 X |
| 4,228,136 | 10/1980 | Thomas | 206/5.1 X |
| 4,582,076 | 4/1986 | Prat | 134/57 R |
| 4,779,633 | 10/1988 | Thomas et al. | 134/93 |
| 4,784,167 | 11/1988 | Thomas et al. | 134/93 |
| 4,852,591 | 8/1989 | Wisotzki et al. | 134/57 R |
| 4,852,594 | 8/1989 | Chen | 134/140 |
| 4,890,729 | 1/1990 | Ranalletta | 206/5.1 |
| 4,957,128 | 9/1990 | Chen | 134/118 |

FOREIGN PATENT DOCUMENTS 0319732 12/1989 Japan .................................. 134/901
0254416 10/1990 Japan .................................. 134/901

OTHER PUBLICATIONS

Clensatron Lens Cleaning Device/Product Brochure, 1989 C98 Advertisement from "The Media Developement Group".

Primary Examiner—Philip R. Coe
Attorney, Agent, or Firm—Cumpston & Shaw

[57] ABSTRACT

A device for cleaning contact lenses through agitation using fluids under high pressure which includes a housing having an internal compartment or cleaning tank which includes impeller means suitable to drive a fluid under pressure. The housing further including a continuous sealed passageway to allow for the flow of the fluid under pressure, with the internal compartment designed to receive a removable case which holds a pair of contact lenses in place within a pair of closed perforated cleaning chambers. Means are provided for driving a pair of impellers in order to move a cleaning fluid under pressure through the sealed passageway to simultaneously clean the contact lenses held within the cleaning chambers.

6 Claims, 6 Drawing Sheets

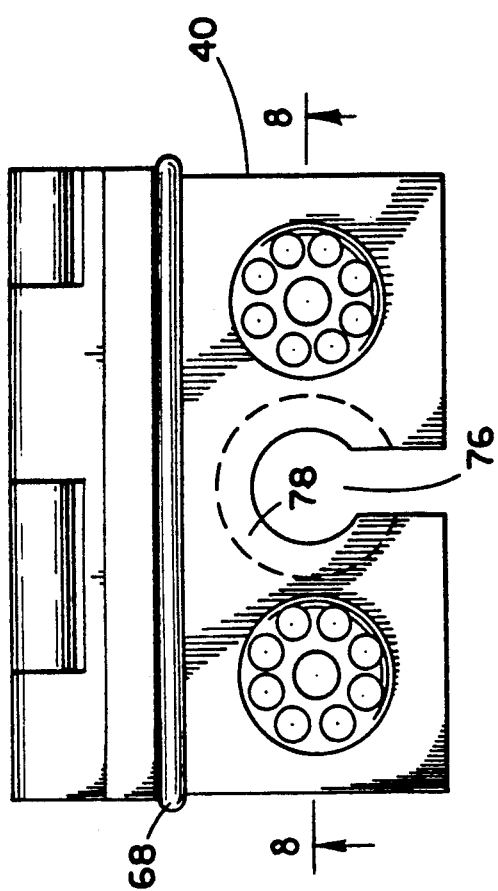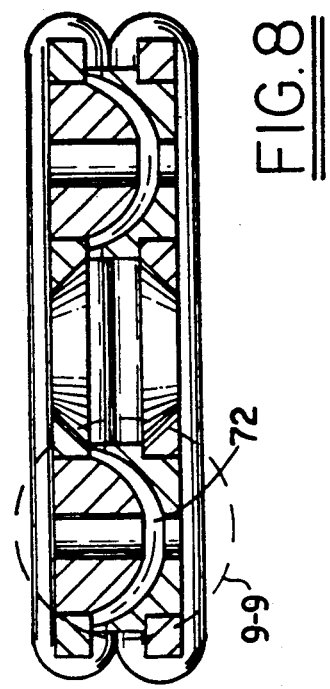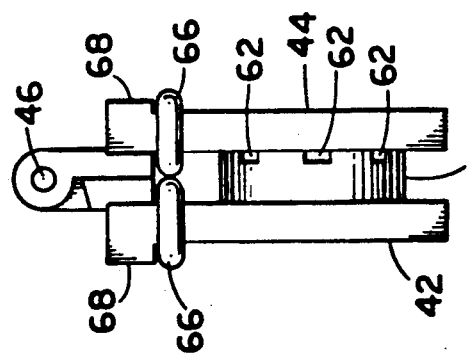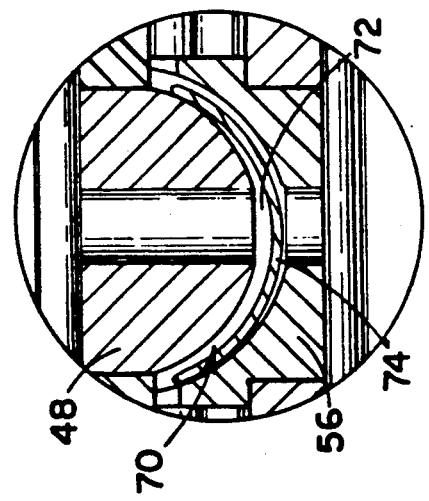

CLEANING DEVICE

BACKGROUND OF THE INVENTION

The present invention relates in general to a device for cleaning optical, glass or plastic objects, and more specifically, to a device which cleans contact lenses using fluids under high pressure and agitation. In the field of lens cleaning devices, typical devices which are available in the marketplace comprise apparatus which cleans a lens in a manner similar to which a washing machine operates to wash and clean clothes. Numerous patents have issued covering various types of lens cleaning devices. These patents are directed to complex and relatively expensive hardware and do not appear to provide the type of high pressure and agitation necessary in order to effectively clean contact lenses in a highly efficient and effective manner.

It is, therefore, an object of the present invention to provide a simple, yet highly efficient lens cleaning device which efficiently and effectively cleans contact lenses in a unique manner not available in the field.

SUMMARY OF THE INVENTION

The present invention is directed to a lens cleaning device which uses fluid under high pressure and agitation to clean and rinse away impurities from the contact lens surface. The device comprises a housing which contains an inner compartment or tank having a pair of impellers which drive a cleaning fluid through a closed fluid-tight continuous system. A removable case which is designed to contain and hold a pair of contact lenses in a sealed position within a pair of cleaning chambers, is adapted to be inserted and placed in a sealed position within the inner compartment of the housing. The housing is filled with a cleaning fluid, and the case is then closed and inserted in position within the housing. A motor is used to pump the fluid in a continuous recyclable flow path through the use of a pair of impellers each housed in a surrounding impeller chamber through adjacent continuously connected channels which results in simultaneously cleaning both surfaces of the lenses. The mechanism and function of the impellers cause the lenses to vibrate or agitate within the cleaning chambers, resulting in a vigorous cleaning action on both surfaces of the lenses.

BRIEF DESCRIPTION OF THE DRAWINGS

FIG. 6 is a side view of the cage;

FIG. 7 is an end view of the cage of FIG. 6;

FIG. 8 is a sectional view of FIG. 6 through lines 8—8;

FIG. 9 is an expanded sectional view of section 9—9 of FIG. 8;

DETAILED DESCRIPTION OF THE INVENTION

Figure 1:
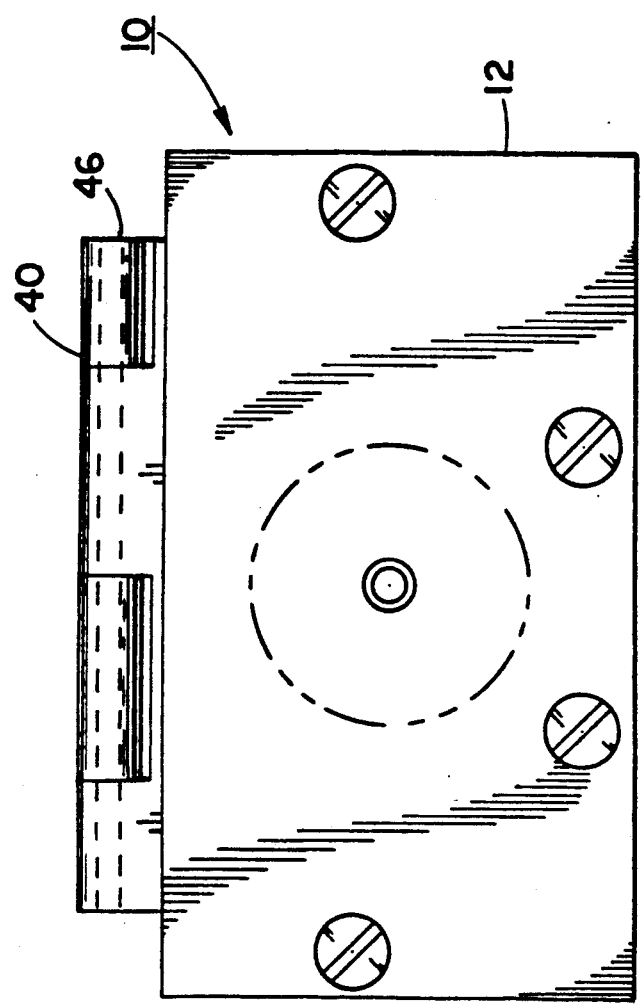
FIG. 1 is an end elevational view of the housing of the present invention with an insertable case in place.
Figure 2:
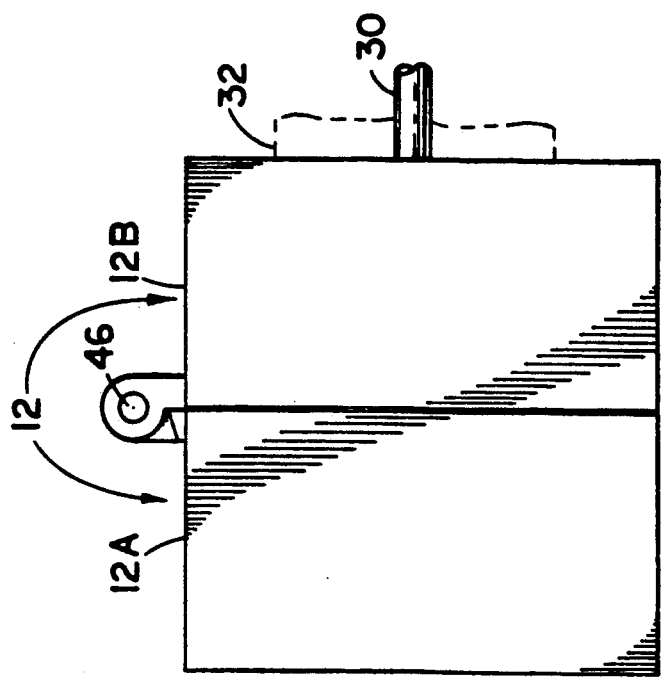
FIG. 2 is a side elevational view of the device of FIG. 1.
Figure 4:
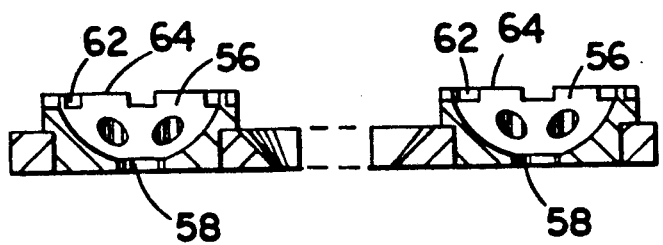
FIG. 4 is a view of FIG. 3 along lines of 4—4.
Figure 3:
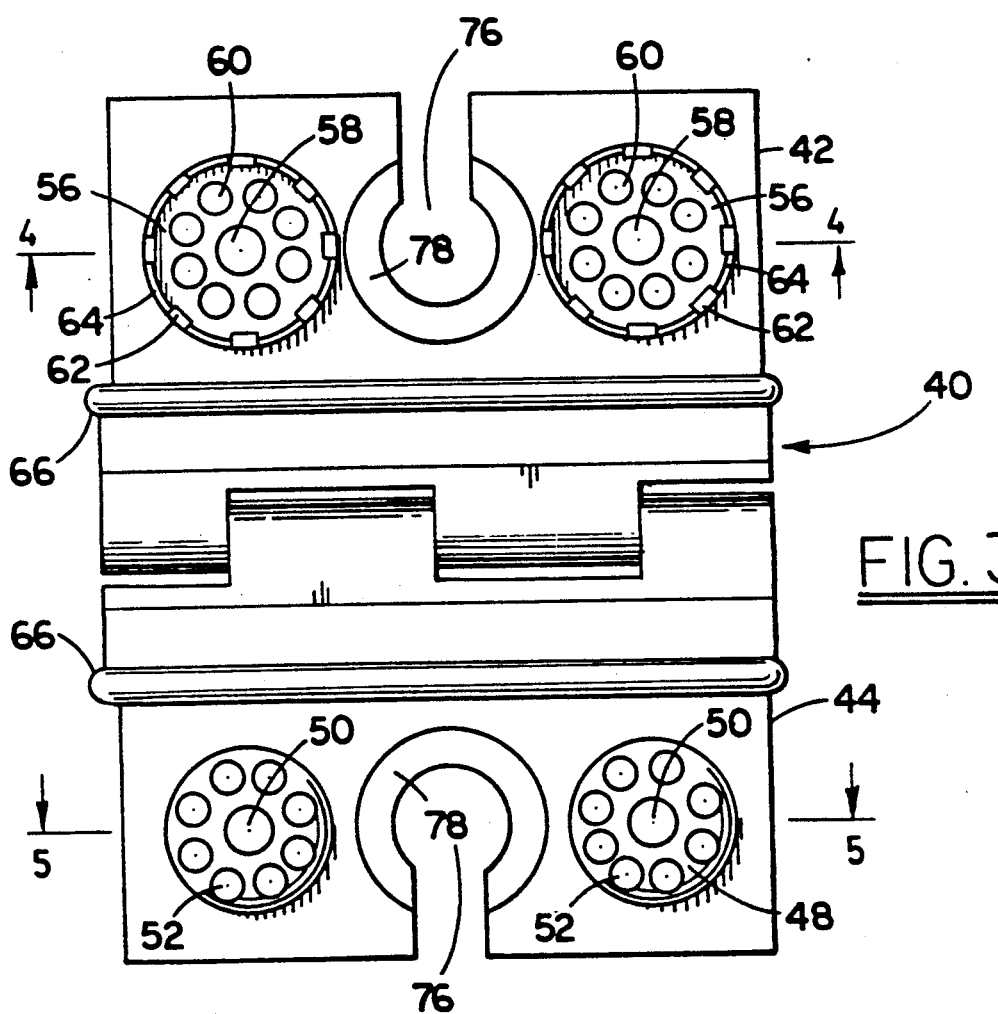
FIG. 3 is a view of the case in the open position illustrating two lens-holding cleaning chambers.
Figure 10:
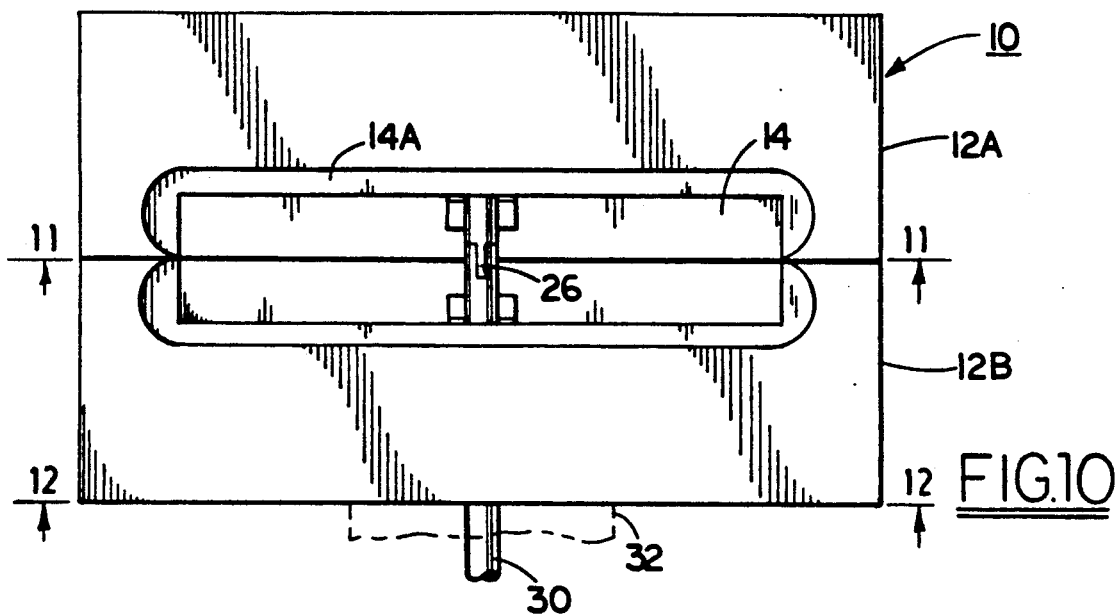
FIG. 10 is a top view of the housing without the cage in place.

With reference to the drawings, FIG. 1 illustrates an end view of the lens cleaning device of the present invention identified by reference character 10. The device 10 includes a housing 12 which is made up of a pair of complementary halves 12A and 12B which contain an inner compartment 14 (FIG. 10) having a pair of impellers 16 and 18 which are mounted to and driven by a drive shaft 30 which is connected to a motor 32. The motor may be of any type which is suitable to power the impellers at a speed which will move the cleaning fluid with a flow velocity which will satisfactorily clean the lenses. Impeller speeds of about 300 to 800 rpm have been found to be satisfactory. Inner compartment 14 contains a stepped ridge 14A (FIGS. 10 and 11) near its top surface which functions as a sealing means to be described in greater detail later. A removable case 40 designed to contain and hold a pair of contact lenses in a fixed position within a pair of cleaning chambers (to be described in greater detail hereinafter) is adapted to be inserted and placed in a fixed position within inner compartment 14 of housing 12.

Complementary halves 12A and 12B of housing 12 each contain complementary recessed connecting channels 20, 22 and 24 (FIG. 11) through which cleaning fluid is pumped in a continuous manner through action of impellers 16 and 18 when removable case 40 is in the inserted position and seals the device to create a closed continuous path for the cleaning fluid. Channels 22 and 24 surround the cleaning chambers 70 of case 40 when it is inserted in compartment 14 of housing 12, and complementary channels 20 each house, respectively, impellers 16 and 18.

Figure 5:
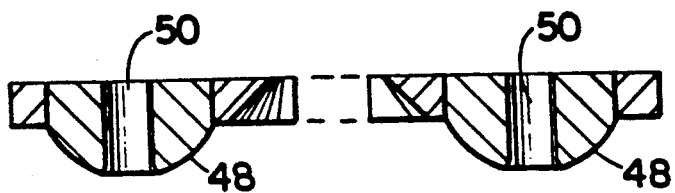
FIG. 5 is a view of FIG. 3 along lines of 5—5.

The case 40 comprises a complementary pair of side plates 42 and 44 hinged at 46 (FIGS. 1, 2, 3 and 15). In the flat open position shown in FIG. 3, side plate 44 contains a pair of convex projections 48, also shown in FIG. 5, each containing a central hole 50 therethrough and a plurality of holes 52 disposed around the outer periphery in order to allow for the passage of fluid during the cleaning operation. A side plate 42 contains a pair of complementary concave recessed sections 56 which are designed to receive projections 48 of side plate 44 when the case is in the closed position and form a pair of cleaning chambers 70, as illustrated in FIGS. 6, 7, 8 and 9. The recessed sections contain a central hole 58 and a plurality of holes 60 around the outer periphery which align with the holes of the complementary projections 48 when the case is in the closed position. The recessed sections 56 further contain alternating peripheral notches or slots 62 and crowns 64, respectively, with the notches defining a plurality of outlet ports for the cleaning fluid when the case is in closed position as illustrated in FIG. 7. In the closed position the projections 48 and recessed sections 56 form a pair of enclosed cleaning chambers 70 having a space 72 (FIGS. 8 and 9) adapted to hold a contact lens 74 in a confined location during cleaning, yet allow for limited movement of a lens during cleaning within the chamber. The case further contains a pair of rubberized seals 66 which when the case is in the inserted, seated position in housing 12, allow for the device to be fluidtight, and form a continuous path or passageway for the cleaning fluids through chambers 20, 22 and 24. The seals 66 are held in place against a raised ridge 68 contained on each side of plates 42 and 44 of case 40, and mate with the stepped ridge 14A of housing 12 to form a fluid tight seal.

The case may optionally be used and/or designed to also serve as a self contained container for transporting and storing contact lenses in a storage solution when not being used in the cleaning device.

In operation the housing is first filled to a predetermined level with a cleaning fluid. The case 40 is opened and a pair of contact lenses are placed within recessed sections 56. The case is then closed along hinge 46 to seal the lenses within the chamber 70 formed by projections 48 and recessed sections 56 as shown in FIGS. 6, 7, 8 and 9. A keyway 76 designed into both side plates of the case structure allows for the case to be inserted around the drive shaft 30 contained in housing 12 when the case is in the inserted position as illustrated in FIGS. 1, 2, 14 and 15. The keyway further contains a beveled surface 78 which functions to aid in recirculating the cleaning fluid back to impeller channels 20 at an accelerated speed to further increase fluid pressure for more efficient cleaning action. A pair of projections 80 having a beveled section 82 are located in the bottom of inner compartment 14 and are designed to fill the slotted open portion of keyway 68 at beveled surface 78 to complete a sealed fluidtight closed path for the cleaning fluid. It should be understood that the device of the present invention may be designed to include means such as a sealed port in the housing to allow for the device to be filled with cleaning fluid when the case 40 is in the inserted position within the housing.

Figure 11:
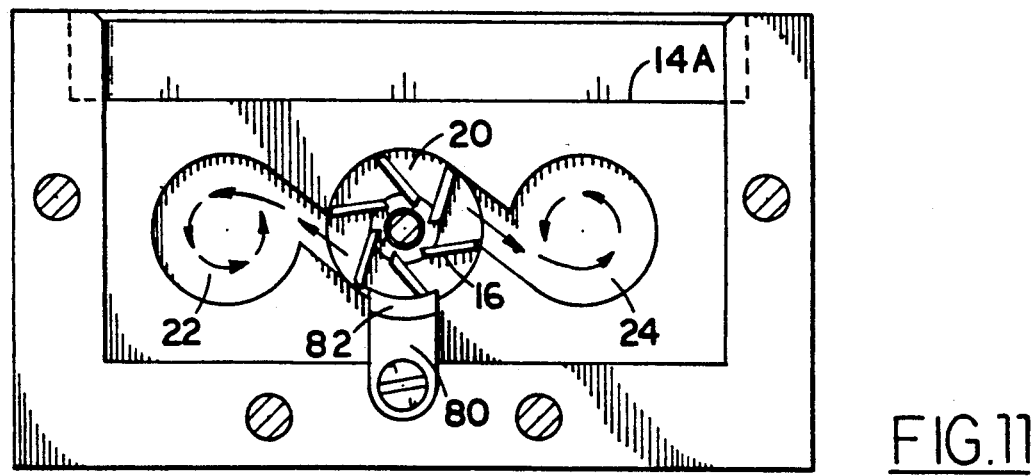
FIG. 11 is a cross-sectional view of one half of the housing of FIG. 10 along lines 11—11 illustrating the fluid flow chambers and the impeller.
Figure 12:
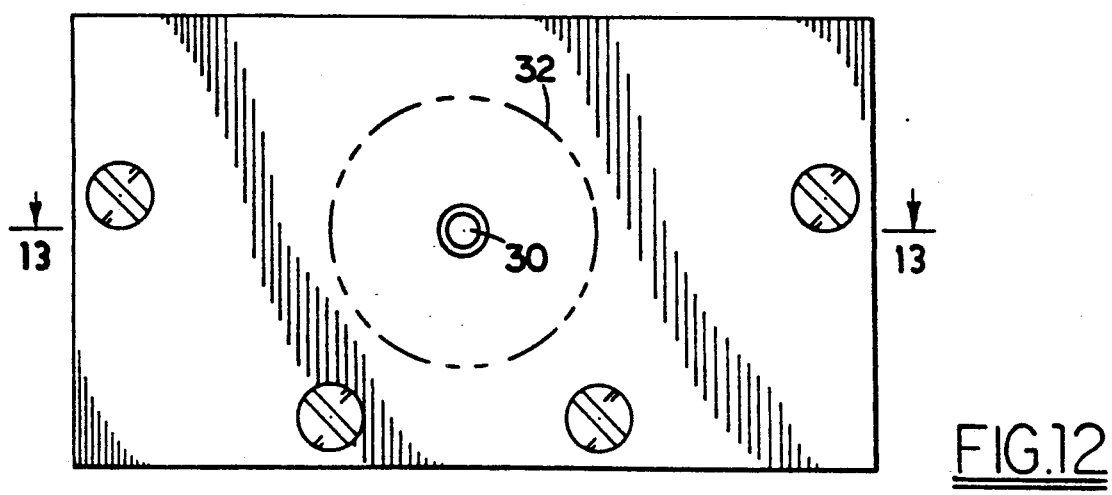
FIG. 12 is a cross-sectional view of FIG. 11 from the opposite direction shown in FIG. 11 along line 12—12 of FIG. 10.
Figure 14:
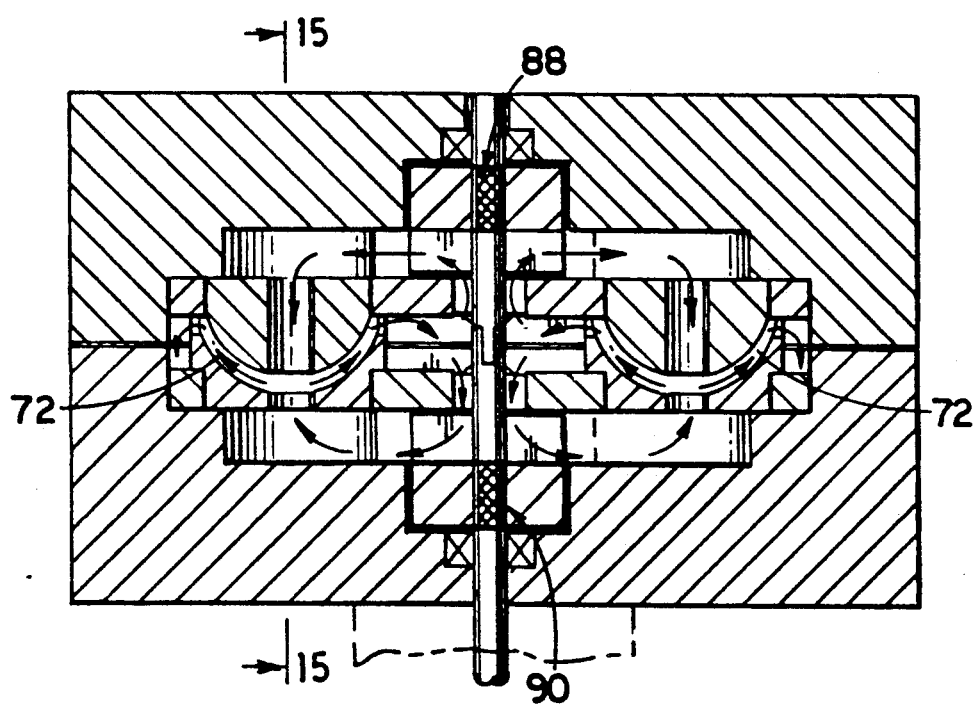
FIG. 14 is a view of the device of FIG. 13 with the case inserted in place.

When case 40 is in the closed and inserted position within the housing, the motor 32 is then turned on which rotates the drive shaft to rotate the impellers which pump the fluid in a continuous recyclable manner out of the impeller channels 20 and simultaneously through continuous channels 22 and 24 formed adjacent thereto, and through the holes in the cleaning chamber 70 surrounding the lenses, resulting in the simultaneous cleaning of both surfaces of the lenses. The cleaning is carried out at a highly accelerated speed which is accomplished by the relatively smaller diameter or size of the holes in the cleaning chamber as compared to the larger overall diameter of channels 22 and 24. Arrows contained in FIGS. 11 and 14 illustrate the flow of the cleaning fluid during operation of the device. As illustrated by the arrows in the drawings, cleaning fluid leaves impellers 16 and 18 (FIG. 11) and travels to chambers 22 and 24. From there it passes through outlet ports or notches 62 of cages formed by projections 48 and recessed sections 56 (FIGS. 3 and 7) into inner compartment 14 (FIG. 10) and travels back to the keyway section 76 surrounding chamber 20 where it completes the cycle. The whole flow process described above is continuous. The notches 62 (FIGS. 3 and 7) serve as drain ports for the cleaning fluid after it has passed through the holes 50, 52, 58 and 60 in the cleaning chambers. The alternating crowns 64 allow for contact lens clearance space when the case (FIGS. 7 and 9) is in the closed position. The mechanism and function of the impellers in pumping the cleaning fluid cause the lenses 74 to vibrate and agitate within the confined space within cleaning chambers 70 and result in a vigorous cleaning action on both sides of both lenses.

Any suitable cleaning fluid may be used with the device of the present invention. Typical cleaning solutions comprise dilute saline solutions. Suitable commercially available cleaning solutions are available under the trademarks SOFT MATE, available from Barnes-Hind Pharmaceuticals, Inc. and SENSITIVE EYES, available from Bausch & Lomb. Soaps and detergents may also be used in conjunction with the cleaning solution.

Figure 13:
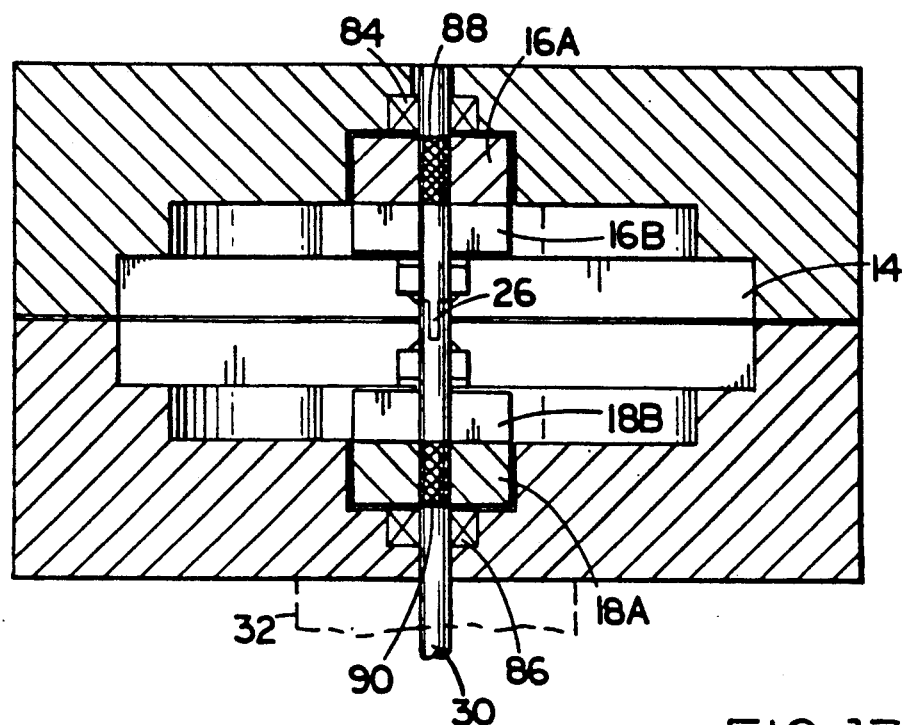
FIG. 13 is view of the device of FIG. 12 taken along lines 13—13.

FIG. 13 illustrates the position of the impellers 16 and 18 and shaft bearings 84 and 86 which support drive shaft 30, and the internal chamber formed by both halves of housing 12. As illustrated, the impellers comprise a unitary structure which include back plates 16A and 18A, respectively, and blades or fins B and 18B, respectively. The impellers are fixed in place by a friction fit over knurled portions 88 and 90 of shaft 30. The shaft 30 is joined at joint 26 to form a unitary shaft.

Figure 15:
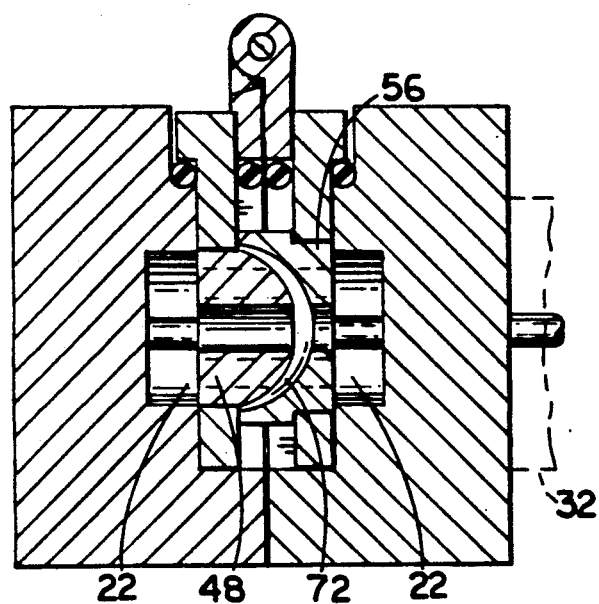
FIG. 15 is a view of FIG. 14 taken along lines 15—15.

FIGS. 14 and 15 illustrate sectional views which present the device with the case in place, and show the inner compartment in combination with the cleaning chamber formed by the case in its closed position. FIG. 14 also illustrates the flow path for the cleaning fluid described above.

Figure 16:
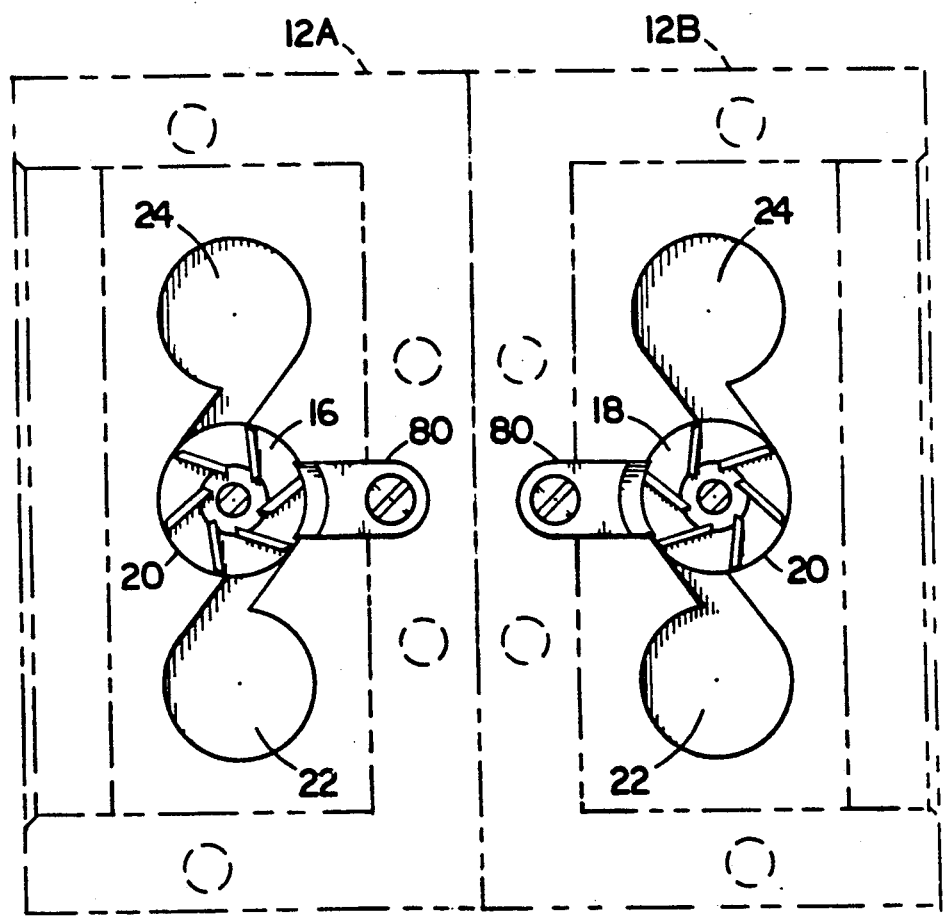
FIG. 16 is a partial side view of each half of the housing illustrating the fluid flow chambers and pitch of the impeller blades.

FIG. 16 illustrates both halves of the housing showing the internal complementary chamber elements and impellers 16 and 18. In order to provide for the desired flow path for the cleaning fluid, the impeller blades or fins are pitched in opposite directions, but when facing each other, as in the device of the present invention, are pitched in the same direction.

Although the invention has been described in terms of specific embodiments described herein, other features and modifications such as the following may be used in conjunction with the disclosed invention:

1. Refillable and/or disposable cartridges, tanks, etc. of distilled water, saline solutions, cleaning solutions, etc. could be attached and used in conjunction with the operation of the device.

2. The holes (nozzles) in the cleaning chambers can be adjusted to different sizes, angles, etc. to adjust for different types of spraying.

3. The exit ports and cavities of the impellers can be adjusted in size and shape to use less solutions, and/or help the solutions flow equally over the intakes of the nozzles.

4. Intake manifolds with fluid control devices could be incorporated for filling the tank and cavities with the different cleaning solutions.

5. A fluid control device could be incorporated into the cleaning unit to allow used fluids to exit into a holding tank, sink drain, etc.

6. Electrical wire coils could be placed around the housing for heat disinfecting the lenses.

7. An operational program could be developed and incorporated in the cleaning unit to control all basic operating parameters such as impeller speed, valves, coils, drains, temperatures, cycle time, etc.

8. The unit could be designed to run on batteries and/or AC power to make it portable, or manufactured using a separate battery operated unit that would be portable (for the traveler).

9. A transmission could be used to control the speed of the impellers to enable the use of a smaller or larger motor. Different impellers (shape, size, material used, etc.) could be used to improve fluid flow.

Although the present invention has been described with regard to a preferred application for cleaning contact lenses, it should be understood that the concept of the invention can be applied to cleaning objects other than contact lenses. For example, other optical elements, small glass, plastic and/or ceramic parts or objects of various sizes and shapes could also be cleaned with the disclosed device. In such instances, the size and shape of the cleaning chamber would be modified to accommodate the size and shape of the object being cleaned.

While the invention has been described in detail with respect to specific embodiments thereof, it will be understood by those skilled in the art that variations and modifications may be made without departing from the essential features thereof.

What is claimed is:

1. A device for cleaning contact lenses which comprises:
   (a) a housing having an inner compartment or tank which includes a continuous passageway formed by a plurality of internal opposed interconnecting recessed channels which allow for the flow of fluid under pressure;
   (b) a pair of oppositely opposed impellers contained within two of said recessed channels, said impellers being suitable to drive a fluid under pressure;
   (c) said inner compartment further containing a removable case in sealed engagement with said compartment to define a fluid tight closed system, said case being designed to hold at least one contact lens in place opposite and between one pair of said recessed channels adjacent said impellers; and
   (d) means for driving said impellers in order to move a cleaning fluid under pressure through said continuous passageway to simultaneously clean both surfaces of said contact lens.

2. The device of claim 1 in which the removable case includes a pair of cleaning chambers which are disposed between and opposite said recessed channels adjacent said impellers, and are adapted to contain and hold in place a pair of contact lenses, and provide for direct contact of cleaning fluid simultaneously against both surfaces of each lens.

3. The device of claim 2 in which the cleaning chambers of the case are perforated and designed to contain and hold a pair of contact lenses within a confined space, and yet allow for limited movement of the lenses within said chambers in response to movement of the cleaning fluid under pressure.

4. A device for cleaning contact lenses which comprises:
   (a) a housing having an inner compartment which includes a continuous passageway formed by a plurality of interconnecting recessed channels which allow for the flow of fluid under pressure;
   (b) a pair of impellers contained within two of said recessed channels, said impellers being suitable to drive a fluid under pressure;
   (c) said inner compartment further containing a removable case in sealed engagement within said compartment to define a fluid tight closed system, said close being designed to hold a pair of contact lenses in place opposite and between a plurality of said recessed channels adjacent said impellers; and
   (d) means for driving said impellers in order to move a fluid under pressure through said continuous passageway to simultaneously clean both surfaces of each lens.

5. The device of claim 4 in which the removable case includes a pair of cleaning chambers which are disposed between and opposite said recessed channels adjacent said impellers, and are adapted to contain and hold in place said contact lenses, and provide for direct contact of fluid simultaneously against both surfaces of each lens.

6. The device of claim 5 in which the cleaning chambers of the case are perforated and designed to contain and hold the pair of contact lenses within a confined space, and yet allow for limited movement of the lenses within said chambers in response to movement of the fluid under pressure.

* * * * *